United States Patent [19]

Ulmer

[11] Patent Number: 4,560,180
[45] Date of Patent: Dec. 24, 1985

[54] SHOPPING CART

[75] Inventor: Harrold Ulmer, Sunland, Calif.

[73] Assignee: Whittar Industries, Ltd., Los Angeles, Calif.

[21] Appl. No.: 619,575

[22] Filed: Jun. 11, 1984

[51] Int. Cl.[4] .............................................. B62B 3/08
[52] U.S. Cl. ..................... 280/33.99 B; 280/33.99 F
[58] Field of Search ................. 280/33.99 F, 33.99 R, 280/33.99 B, 33.99 S, 33.99 H

[56] References Cited

U.S. PATENT DOCUMENTS

| | | | |
|---|---|---|---|
| 3,245,498 | 4/1966 | Stanley et al. | 280/33.99 F |
| 3,437,176 | 4/1969 | Ruttenberg et al. | 280/33.99 B |
| 3,751,059 | 8/1973 | Dunder et al. | 280/33.99 F |
| 3,815,932 | 6/1974 | Ruger | 280/33.99 F |
| 4,067,591 | 1/1978 | Celms | 280/33.99 F |
| 4,116,456 | 9/1978 | Stover et al. | 280/33.99 F |
| 4,118,044 | 10/1978 | Celms | 280/33.99 F |
| 4,273,346 | 6/1981 | Rehrig | 280/33.99 F |
| 4,423,882 | 1/1984 | Stover et al. | 280/33.99 B |

Primary Examiner—David M. Mitchell
Attorney, Agent, or Firm—Donald E. Nist

[57] ABSTRACT

A shopping cart of the over-the-counter type that includes front gates that slide under the basket of the shopping cart for storage purposes. The gate bumpers that are constructed and defined to permit the slide under action are interlocked with the front gate to prevent the ready theft of the front gate from the shopping cart. The front gate is provided with a positive latch to the basket to further prevent the unintentional opening of the gate. The baby seat compartment has a gate that may be pivoted forwardly and rearwardly as well as an upright back supporting position. The shopping cart is constructed of a single frame element for supporting the basket and baby compartment and functioning as a cart handle. The basket is pivotally supported on the frame element to permit it to be swung rearwardly to a storage position over the baby seat compartment. The forces transmitted to the baby seat compartment for elevating the basket are transmitted to the handle rather than the baby seat compartment.

22 Claims, 13 Drawing Figures

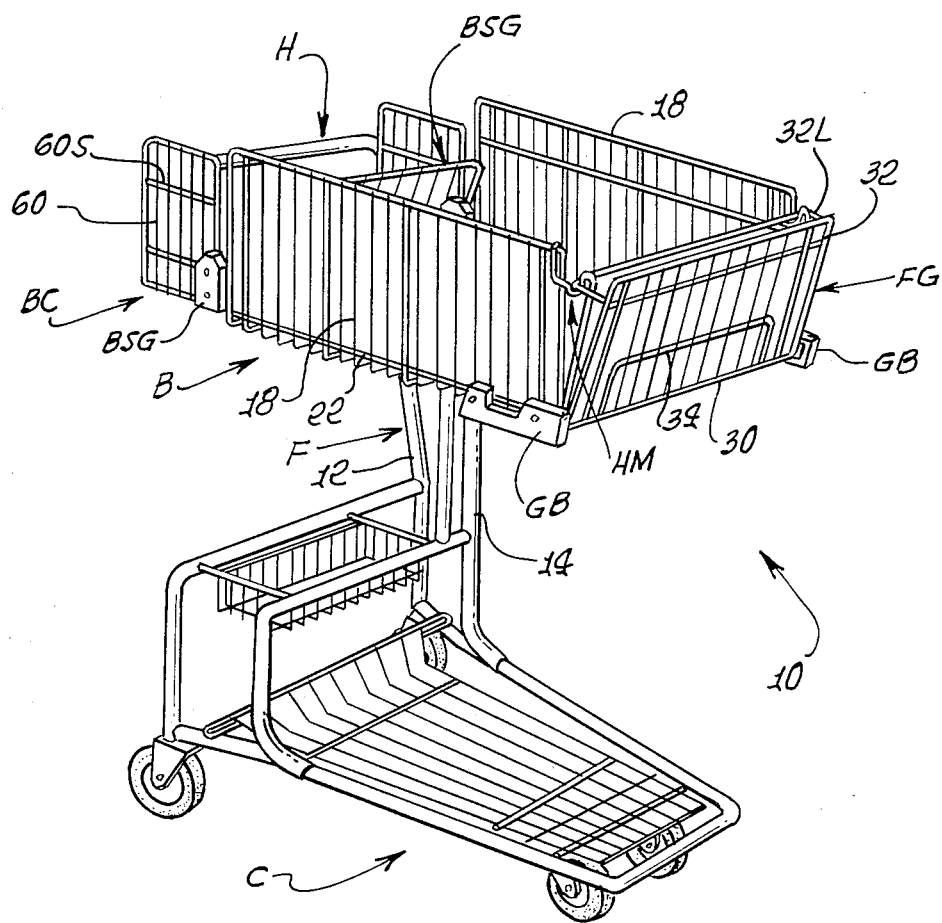

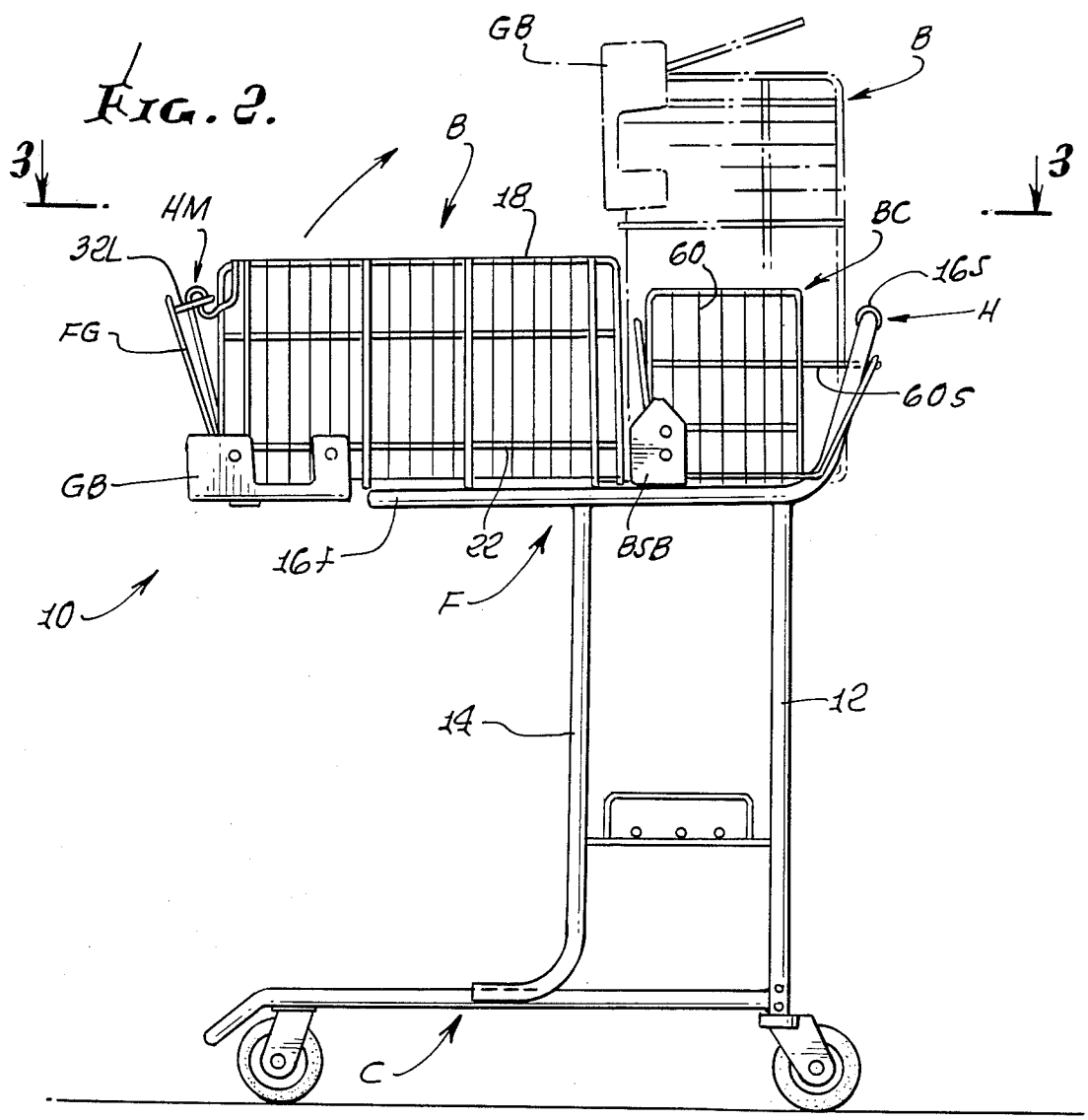
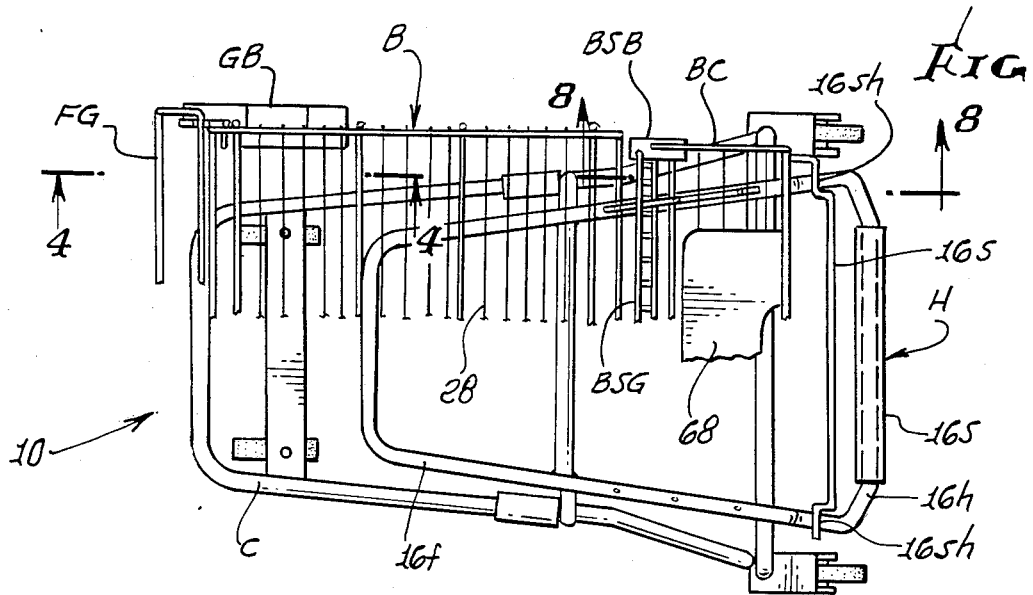

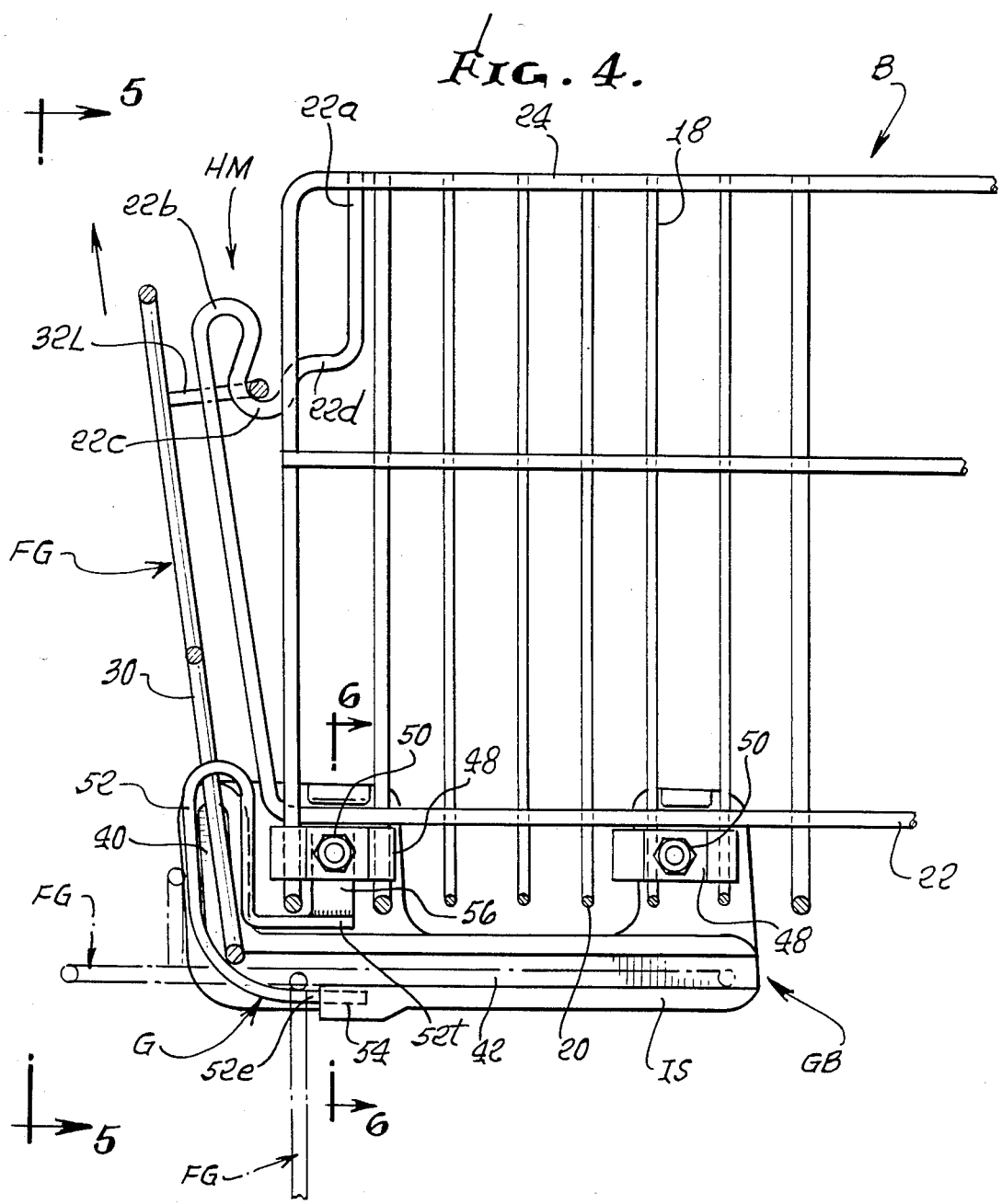

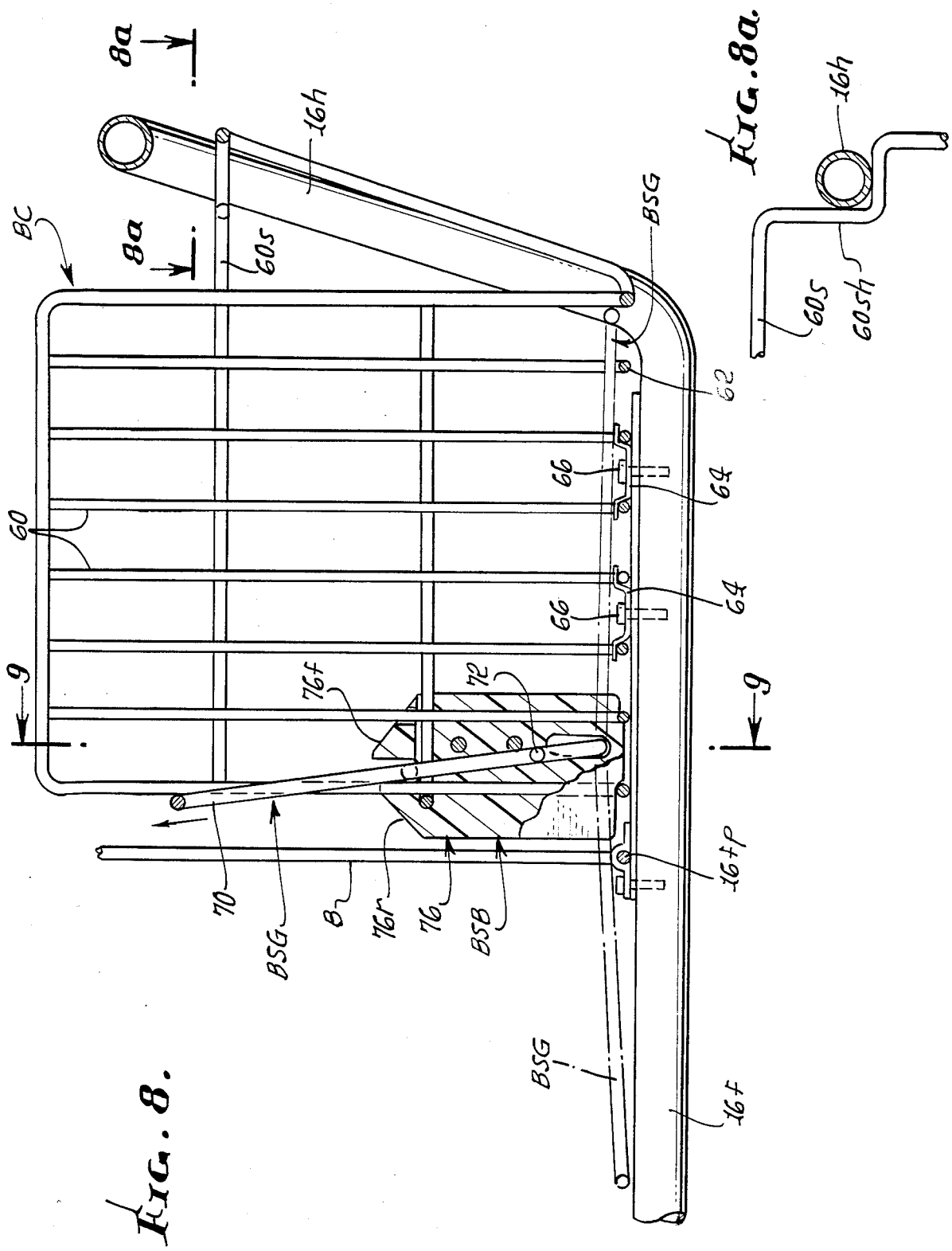

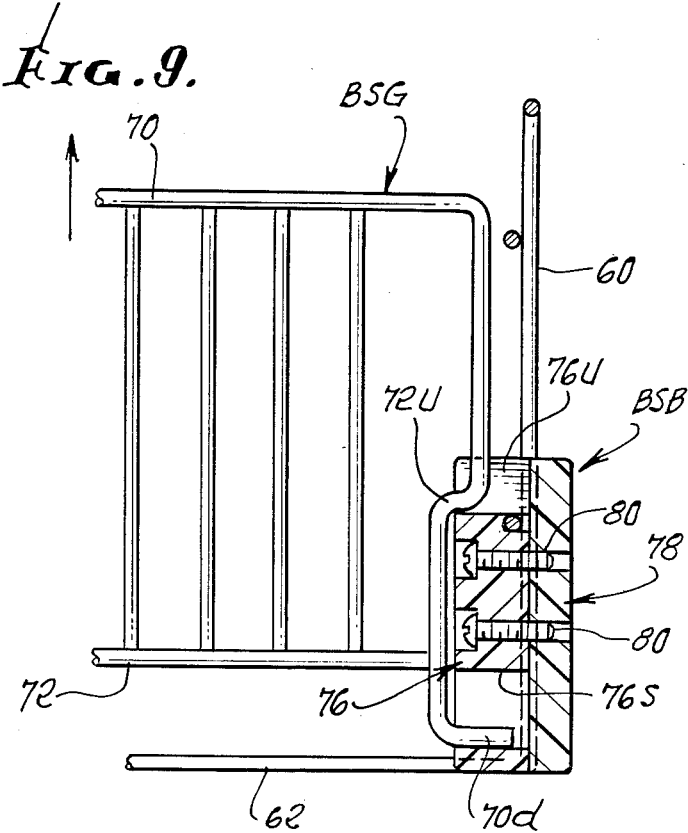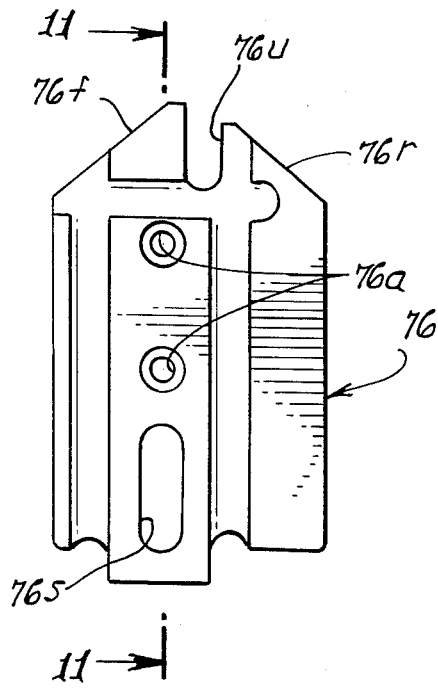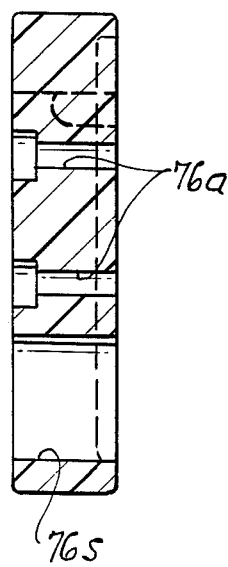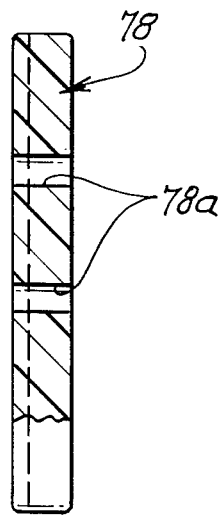

SHOPPING CART

FIELD OF INVENTION

This invention relates to improvements in shopping carts and more particularly to improvements in the over-the-counter type of shopping cart.

BACKGROUND OF INVENTION

Shopping carts are conventionally constructed to be wheeled around stores such as supermarkets, drugstores, hardware stores, or the like, as the customer accumulates and stores the goods he desires to purchase in the basket for the shopping cart. At the time the shopper has completed storing all the goods he desires to purchase in the shopping cart, the shopper proceeds to the store checkout counter to have the goods priced and billed. The conventional shopping carts are generally pushed to one side of the checkout counter to allow the goods to be unloaded therefrom for pricing by the checkout clerk. These conventional types of shopping carts have been provided with a baby seat compartment, adjacent the rear of the cart, so that a young child may be safely seated in the compartment while the shopper pushes the cart around the business establishment and selects the goods he wishes to acquire. The baby seat compartment is generally constructed and defined so that the young child faces the shopper pushing the cart. Such conventional baby seat compartments are usually collapsible in some manner to permit the volume of the cart basket to be increased for storing additional merchandise therein when there is no need to use the baby seat compartment.

A more recent type of shopping cart that has been developed is known in the art as an over-the-counter cart and is in extensive use at the present time. The over-the-counter type of shopping cart has been designed to permit the merchanise-laden basket of the cart to be moved over the top of a checkout counter. For this purpose, the basket for the cart is supported on one side of the cart by an elevated frame for supporting the basket just above the top of the checkout counter as the cart is moved through the checkout counter. The baskets for such over-the-counter shopping carts are generally provided with a front gate that is movable to an open position to overlie the checkout counter to permit the checkout clerk to slide the goods stored in the basket from the bottom of the basket to the countertop, one-by-one, as the clerk prices each piece of merchandise on a cash register. These over-the-counter type of shopping carts are also designed with baby seat compartments that are collapsible to increase the storage capacity thereof. Typical prior art over-the-counter type of shopping carts is disclosed in U.S. Pat. Nos. 3,751,059; 3,815,932; and 4,067,591. These over-the-counter carts are generally designed to permit the baskets to be lifted and moved rearwardly over the baby seat compartment for nesting with similarly constructed carts. Such nestable carts, for example, are described in U.S. Pat. No. 4,423,882.

Checkout counters have been improved in recent years by the addition of electronic scanners built into the top of the checkout counters for scanning the coded price data recorded on each piece of merchandise. When an over-the-counter type of shopping cart is utilized with a checkout counter equipped with an electronic scanner, the positioning of the open front gate on the counter has been found to interfere with the operation of the scanners and other checkout operations. Accordingly, over-the-counter carts have been developed that permit the front gate of the basket to be slipped underneath the cart basket and stored thereunder while the cart overlies the checkout counter during the checkout operation, thereby not interferring with the checkout operations and the scanner and yet allowing each piece of merchandise to be slipped from the basket onto the counter top to be accounted for by the checkout clerk. An over-the-counter type of cart having such a storable gate is disclosed in U.S. Pat. No. 4,118,044. Experience with this type of cart has proven the ease with which individuals may remove the front gate of the cart when it is open, when they desire to use such gates for barbecues, or the like. In addition, experience has proven that the latching mechanisms for the front gates for some of these over-the-counter type of carts are imperfect to the extent that when the basket is loaded with merchandise, some of these prior art mechanisms become unlatched due to the pressure exerted by the merchandise against the front gate. The prior art elevated frames for these carts are generally constructed with separate U-shaped frame elements and handles. Accordingly, at the present time, improvements in the over-the-counter type of carts, to avoid, in particular, the aforementioned problems of the prior art carts, is desired.

SUMMARY OF INVENTION

The present invention provides an improved and economical shopping cart and, in particular, an improved over-the-counter type of shopping cart that is constructed and defined to minimize the theft problems associated with carts having the so-called "slide under" gates, and yet has all the advantages exhibited by such prior art constructions. The cart of the present invention also includes a positive latching mechanism for the front gates of the shopping carts to prevent the unintentional opening of the front gates, including when the carts are laden with goods. The shopping cart of the present invention also includes an improved frame element to provide more rigid support for the basket than is found in prior art frames and is advantageously constructed and defined as a single unitary element shaped to function as a cart handle, as well as a basket supporting frame. The shopping cart is further advantageously constructed and defined to minimize the shock to the baby seat compartment when the basket is moved from its normal goods-carrying position to a vertical storage position by transferring the forces from the basket to the handle and not back on the baby seat compartment. The shopping cart of the present invention is also provided with an improved baby seat compartment that permits the front gate of the compartment to be utilized as a backrest for a young child seated therein, and yet is movable in either a forward or reverse direction to increase the capacity of the basket when the baby seat compartment is not required. The ability to move the gate backwards allows the shopping cart to be unloaded without moving merchandise over the gate.

From a structural standpoint, the present invention comprehends a shopping cart having a wheeled chassis with an elevated frame carried by the chassis and an upwardly open basket including spaced side walls upstanding from a bottom wall. The bottom wall of the basket is carried by the elevated frame and the basket has an opening at the rear end thereof. A baby seat compartment is secured to the rear portion of the elevated frame immediately behind the open rear end of the basket. The baby seat compartment includes spaced side walls upstanding from a bottom wall and a baby seat gate arranged adjacent the front of the baby seat compartment between the side walls thereof. Pivot means is secured adjacent the lower front corner of the baby seat compartment for pivotally securing the baby seat gate to the baby seat compartment. The baby seat gate and the pivot means are constructed and defined relative to one another to maintain the baby seat gate in a releasable upright compartment closing position for seating a baby in the compartment and to permit the gate to be released from its upright position to be swung either forwardly or rearwardly to overlie the bottom wall of the basket or of the baby compartment, respectively. The basket is provided with a front gate that is movably supported on the basket for opening and closing the front of the basket. The basket is also provided with mounting means coacting between the front gate and the basket to pivotally support the gate for permitting movement of the gate between a position wherein the gate extends upwardly from the bottom wall of the basket for closing the front opening of the basket and a position wherein the gate is maintained in an opened position and may be stored in a position located below and substantially parallel with the bottom wall of the basket.

In a further embodiment of the present invention, means for interlocking the front gate and the mounting means for the front gate are provided for preventing the ready removal of the front gate from the basket when the gate is in an opened position. The mounting means can comprise a pair of bumpers mounted adjacent the lower front corners of the basket that are provided with an L-shaped guide track which includes an upwardly extending track portion for permitting the gate to be moved upwardly from the bottom wall of the basket for closing the front of the basket and an elongated substantially horizontally extending track portion which is connected to the lower end of the upwardly extending track portion and projects rearwardly of the basket through a substantial distance away from the front of the basket for permitting the gate to be positioned below and approximately parallel with the bottom wall of the basket. The interlocking means for the front gate comprises guard means for each of the bumpers wherein each guard means is mounted in a preselected spaced relationship with the L-shaped guide track opposite the upwardly extending track portion and the adjacent horizontally extending track portion for a preselected distance rearwardly of the front of the basket. The front gate and the guard means are arranged in an interlocking relationship solely to prevent the gate from being removed from the guide track; i.e., permitting the sliding action of the front gate.

In a further improvement of the shopping cart as disclosed by the present invention, the elevated frame is constructed and defined of a single frame element having a substantially U-shaped portion at one end thereof arranged in a substantially horizontal plane for supporting the basket and a portion closing the end of the U-shaped portion that extends upwardly at a preselected obtuse angle relative to the horizontal plane to function as a handle for the shopping cart.

For the purpose of positively latching the front gate to the front of the basket, hook means are provided on the front of the basket which comprises a wire rod constructed integral with each side wall of the basket and formed with a portion extending forwardly of the front of the basket at a preselected angle from adjacent the bottom of the basket toward the top of the basket. The hook means is formed with a curved portion shaped into a reverse curved portion for positively and releasably securing a gate latch at said reversed curved portion.

BRIEF DESCRIPTION OF DRAWINGS

These and other features of the present invention may be more fully appreciated when considered in the light of the following specification and drawings in which:

FIG. 1 is a right, front perspective view of a shopping cart embodying the present invention;

FIG. 2 is a left side elevational view of the shopping cart of FIG. 1 with the basket for the cart illustrated in dotted outline in a storage position;

FIG. 3 is a sectional view taken along the line 3—3 of FIG. 2 with portions broken away to illustrate the frame elements for the cart;

FIG. 4 is a sectional view taken along the line 4—4 of FIG. 3 illustrating the front gate in a latched position with two alternate positions of the opened front gate illustrated in dotted outline;

FIG. 8 is a sectional view, with portions broken away, taken along the line 8—8 of FIG. 3 and illustrating the baby seat gate in an upright position;

FIG. 8a is a sectional view taken along the line 8a—8a of FIG. 8;

FIG. 9 is a sectional view taken along the line 9—9 of FIG. 8 showing the relationship of the baby seat gate with the baby seat bumper;

FIG. 10 is a detached, side elevational view of a segment of the baby seat bumper of FIG. 9;

FIG. 11 is a sectional view taken along the line 11—11 of FIG. 10; and

FIG. 12 is a sectional view, with a portion shown in elevation, of the other segment of the baby seat gate from that illustrated in FIG. 11.

DETAILED DESCRIPTION OF THE PREFERRED EMBODIMENT OF THE INVENTION

Figure 5:
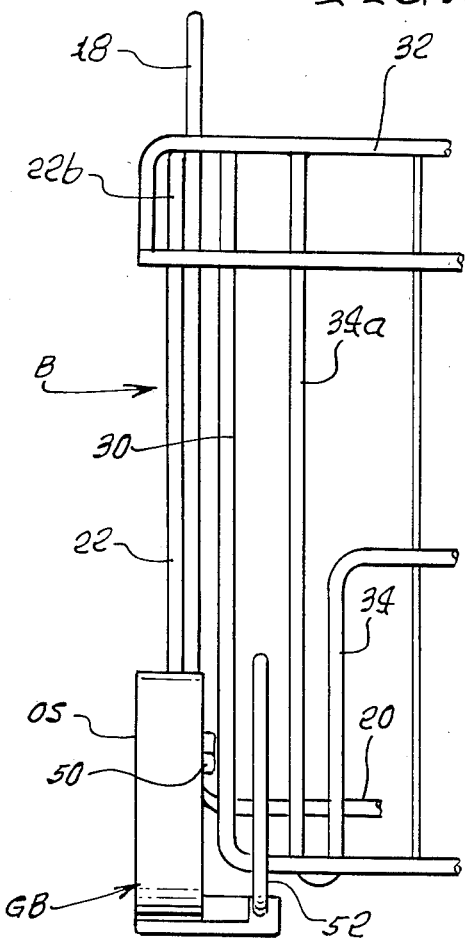
FIG. 5 is a sectional view taken along the line 5—5 of FIG. 4 of a portion of the basket and front gate illustrating the interlocked relationship of the gate and the guard means.
Figure 6:
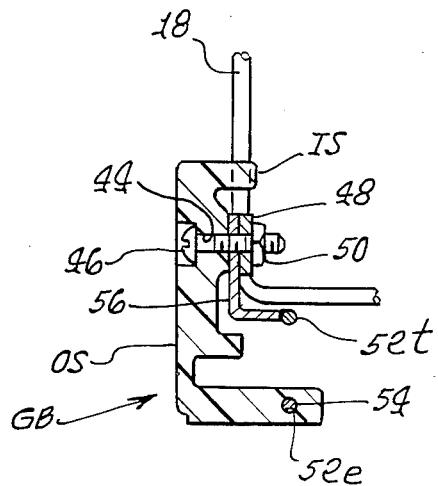
FIG. 6 is a sectional view taken along the line 6—6 of FIG. 4.

At the outset certain terminology will be utilized in order to facilitate the understanding of the invention and simplify the description. The terms "front" and "back", "up" and "down" refer to locations with reference to an individual located with his hands on the handle of the shopping cart for the purposes of pushing the cart as the cart is illustrated in FIG. 1, or behind the cart on the left side of FIG. 1. To this end, the "front" of the shopping cart is the portion spaced forwardly of the individual, with the "rear" of the cart being at the opposite end thereof adjacent the individual. The movement of the shopping cart elements "forwardly" and "rearwardly", then, are similarly oriented with the terms "left" and "right" coinciding with the left and right hands of the individual facing the handle of the shopping cart.

Now referring to the drawings, the improved shopping cart 10 will be described in detail. The shopping cart 10 will be described as the invention is embodied in a shopping cart for moving the cart over the top of a checkout counter to permit the checkout clerk to slide the merchandise from the bottom of the basket onto the counter. This type of shopping cart is advantageously designed to enter the coded pricing data recorded on the merchandise into an electronic point of sale register by passing the merchandise over a slot on the counter for exposing the coded data to the electronic scanner stored under the counter.

The shopping cart 10 basically comprises a wheeled chassis C carrying an elevated frame F for supporting an upwardly opening basket B and a baby seat compartment BC immediately behind the basket B and secured to the frame F immediately forward of the shopping cart handle H. The basket B is provided with a front gate FG pivotally supported to the basket B by a pair of gate bumpers GB and which front gate FG is illustrated in a latched, closed position in FIG. 1. The baby seat compartment BC is provided with a baby seat gate BSG pivotally supported by a pair of baby seat bumpers BSB. The baby seat gate BSG is illustrated in FIG. 1 in an upright position to function as a backrest for an infant facing rearwardly of the shopping cart 10.

The wheeled chassis C is of a conventional configuration that is constructed of metal tubing, along with other frame elements as illustrated. The chassis C has secured thereto on the left side thereof, a pair of frame members 12 and 14 that are both, in turn, secured at the top thereof to the elevated frame F. The elevated frame F is constructed and defined in accordance with the present invention of a tubular element having a substantially U-shaped portion 16F integral with the handle H. In prior art shopping carts, the elevated frames are constructed of U-shaped tubular elements but have separate handles. In this prior art type of frame, the ends of the U-shaped frame element have to be welded closed. The unitary structure for the frame element F of the present invention comprises a unitary tubular element so that the basket supporting portion of the element, or the portion 16f, will be arranged in a substantially horizontal plane over the chassis C and includes a handle portion 16h closing the end of the portion 16f. The basket supporting portion 16f defines a U with the arms of the U flaring outwardly towards the rear of the basket, as illustrated. The handle portion 16h of the frame closes the end of the U-shaped portion 16f and extends upwardly at a preselected obtuse angle relative to the horizontal plane for the frame portion 16f to function as a handle for the shopping cart 10; see FIGS. 2 and 8. The tubular handle portion 16h may be provided with a plastic sleeve 16s mounted to the handle portion 16h of the frame F for permitting better gripping of the handle H. The horizontal portion of the frame on the portion 16f supports the merchandise carrying basket B and the baby seat compartment BC. The basket B is pivotally supported on the frame portion 16f at the pivot point 16fp adjacent the baby seat compartment BC; see FIG. 8. The basket B is pivoted about the point 16fp to permit the basket B to be swung rearwardly over the baby seat compartment BC for storage purposes. This permits similarly constructed shopping carts to be nested with the shopping cart 10. The elevated position of the basket B for storage purposes is illustrated in dotted outline in FIG. 2.

The basket B for the shopping cart 10 may be of any convenient construction and the preferred embodiment thereof is illustrated constructed of a rod and wire mesh construction. The basket B is an upwardly opening basket including spaced side walls 18 upstanding from a bottom wall 20. The bottom wall 20 is pivotally secured to the frame F as discussed hereinabove and is supported on the frame F. The rear end of the basket B is open ended. Each of the side walls 18 of the basket B includes hook means HM constructed and defined to extend forwardly of the basket for positively securing the front gate FG thereto. The hook means HM, in one practical embodiment of the invention, is formed from a stiffener wire rod 22 that is located adjacent the bottoms of each of the side walls 18 of the basket B and extends forwardly of the front of the basket at a preselected angle from adjacent the bottom of the basket B to extend towards the top of the basket. The free end 22a of the stiffener wire rod 22 is shaped to be secured to the top wire rod 24 for the basket B. The hook means HM is formed from this stiffener wire rod 22 intermediate the ends thereof and, in particular, adjacent the top of the basket; see FIG. 4. The hook means HM is formed from the rod 22 with a curved portion 22b directed downwardly and then shaped into a reverse curved portion 22c curved forwardly of the topmost curved portion 22b and including a slightly horizontal portion 22d emerging from the reversed curved portion 22c, and then a vertical portion 22a for securing it to the top wire rod 24 of the basket B. The provision of the reversed curved portion 22c provides a positive latch for the front gate FG so that the front gate will not be unintentionally unlatched or disengaged from the thus defined hook means HM during the carrying of the goods in the basket B. Specifically, the hook means HM is defined to provide a positive latch so that the basket B when laden with merchandise or groceries, the pressure applied to the front gate FG by the merchandise will not cause the hook means HM to open and the merchandise and/or groceries to drop to the floor. This advantage is enhanced by the angular relationship of the front gate FG with the end of the basket B, as illustrated.

The front gate FG is constructed of rod and wire mesh construction as best illustrated in FIGS. 1, 4 and 5 and is of a generally recentangular shape. A U-shaped ring 30 forms the outer frame of the front gate FG with the opposite arms of the U extending vertically. The open end of the U-shaped ring 30 is closed by a lock bar 32. The lock bar 32 extends outwardly of each of the arms of the U-shaped ring 30 a preselected distance. Spaced inwardly of the ring 30 there is provided a stiffening guide rod 34 that has a U-shaped configuration intermediate each of its ends with each arm 34a of the U bent to extend a slight distance below the bottom of the ring 30 and then bent upwardly to be welded at the ends of the arms 34a to the lock bar 32. The lock bar 32 has a U-shaped latch 32L extending rearwardly thereof a preselected distance for engaging the hook means HM for the basket B. The latch 32L for the front gate FG is proportioned so that the latch will slip over the curved portion 22b for the basket B and be positively secured to the reversed curved portion 22c of the hook means HM, as best illustrated in FIG. 4. The front gate FG is also provided with wire mesh webs extending between the lock bar 32 and the ring 30 in a preselected spaced relationship and preferably as illustrated in the drawings.

Figure 7:
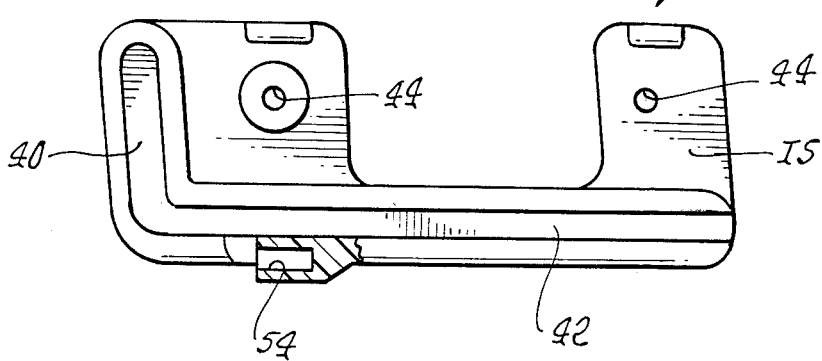
FIG. 7 is a detached, side elevational view of the left hand gate bumper for the cart of FIG. 1, without the guard means secured thereto.

The front gate FG is pivotally secured to the basket B by the gate bumpers GB to permit the gate to be moved for opening and closing the front of the basket B. The gate bumpers GB are secured adjacent the lower front corners of the basket B. The front gate mounting means, or bumpers, GB are constructed and defined to permit coaction between the front gate FG and the basket B to pivotally support the gate for permitting movement of the gate between a position wherein the gate extends upwardly from the bottom wall of the basket B for closing the front opening and a position wherein the gate is maintained in an opened position and may be stored in the position located below and substantially parallel with the bottom wall 20 of the basket B; see FIG. 4. Each of the inside surfaces IS of the gate bumpers GB have an L-shaped guide track defined thereon which includes an upwardly extending track portion 40 for permitting the front gate FG to be moved upwardly from the bottom wall 20 of the basket B for closing the front of the basket; see FIGS. 4 and 7. The L-shaped guide track includes an elongated, substantially horizontally extending track portion 42 which is connected to the lower end of the upwardly extending track portion 40 and projects rearwardly of the basket through a substantial distance away from the front of the basket for permitting the gate to be positioned in an opened position (1) located below and approximately parallel with the bottom wall of the basket B, or (2) dependent from the gate bumpers GB. The gate bumpers GB on the outside surfaces OS thereof have a generally U-shaped configuration so that the bumpers can be secured to the lower right hand corners of the basket B. The gate bumper GB is illustrated in FIG. 4 from the inside surface IS of the bumper and shows the manner in which the bumper is secured to the side walls 18 of the basket B. The outside surface OS of the gate bumpers GB, as illustrated in FIG. 1, is provided with an aperture 44 in each arm of the U of the bumper for receiving fasteners 46 for securing the bumper to the upstanding side walls 18 of the basket B. A specific mode of securing the bumpers GB to the side walls 18 of the basket B is illustrated in FIG. 4. The fasteners 46 extend through the apertures 44 from the outside surface OS to the inside surface IS of the bumpers GB and are secured by means of clips 48 which bridge a pair of the adjacent vertical wires or wire mesh at each arm of the L and have nuts 50 secured to the fastener 46 for securing both gate bumpers GB to the respective side walls 18; see FIG. 4. Both gate bumpers GB are secured in the same fashion.

In accordance with the present invention, the gate bumpers GB include anti-theft guard means G secured to the gate bumpers and spaced a preselected distance inwardly of the L-shaped tracks for guiding the edges of the front gate FG. As illustrated in FIG. 4, the guard means G comprises a wire rod 52 shaped into an L-like configuration with a free end 52e of the lower arm of the U, as illustrated in FIG. 4, being secured into a socket 54 formed adjacent the horizontal track portion 42 of the L-shaped track. The opposite arm 52 of the L-shaped wire rod 52 is welded to an L-shaped bracket 56 that is secured to the side wall 18 of the basket B between the clip 48 and the inner wall of the gate bumper GB. The guard means G is provided in accordance with the present invention for interlocking the front gate FG and the gate bumpers GB for preventing the ready removal of the front gate FG from the bumpers GB or from the basket B. For this purpose, the guard means G are mounted in a preselected spaced relationship with the L-shaped guide track and arranged opposite to the upwardly extending track portion 40 of the guide track and the adjacent horizontally extending track portion 42 for a preselected distance rearwardly of the front of the basket as best illustrated in FIG. 4. The front gate FG and the guard means G are interlocked by passing an end of the guard means G through the front gate FG between the outer ring 30 and the vertical portion 34a of the stiffening guide 34, as best illustrated in FIG. 5. For example, before the lowermost arm 52e of the guard means G, as illustrated in FIG. 4, is press fit into the apertures 54 on the gate bumpers GB, the front gate FG at the aforementioned location can be threaded through the guard means G to cause them to interlock. Once this is accomplished, the arm 52e of the guard means G can then be inserted into its slot 54 to permanently interlock the front gate FG and the guard means G. This occurs at both gate bumpers GB. The relationship of the interlocked front gate FG, the gate bumpers GB and the guard means G, is best illustrated in FIG. 5 wherein the interlocked relationship of these elements is clear. The prior art gate bumpers GB do not utilize anti-theft protection so that the front gate can be readily removed from the basket. This is easily accomplished by opening the front gate and positioning the gate to ride in the horizontal portion of the L-shaped track. When in this relationship, the front gate can be turned at an angle to the track to wedge it against the bumper for releasing it from the track. This is prevented by the anti-theft guard means described hereinabove.

From the above construction, then, the operation of the front gate FG should be apparent. When the front gate FG is in a latched position the latch 32L is secured at the reverse curved portion 22c of the hook means HM with the bottom portions of the front gate being suspended opposite the vertical portions 40 of the L-shaped guide track and the guard means G, as illustrated in FIG. 4. To unlatch the front gate FG, it can be moved rearwardly and upwardly to release it from the hook means HM and allow the gate FG to be moved downwardly to locate the bottom end of the gate in the horizontal portion 42 of the L-shaped guide track for the gate bumper GB. When the front gate FG has been moved to the rear extremity of the gate bumper GB it is in the storage position and this position is illustrated in FIG. 4 in dotted outline. An alternate position of the front gate is also illustrated in dotted outline in FIG. 4 wherein the front gate depends from the gate bumper GB in a vertical relationship.

The baby seat compartment BC comprises spaced side walls 60 upstanding from a bottom wall 62. The bottom wall 62 of the baby seat compartment BC is secured to the frame element F by clips 64 bridging the wire rods forming the bottom wall 62 of the baby seat compartment BC. The clips 64 in turn are secured to the frame F by means of fasteners 66, as best illustrated in FIG. 8. The rear wall (not shown) for the baby seat compartment BC is of conventional construction and is provided with apertures that are spaced for accepting the legs of the baby seated in the baby seat compartment. A plastic seat 68 overlies the bottom wall of the baby seat compartment BC. The front wall of the baby seat compartment BC is provided by the baby seat gate BSG. The baby seat gate BSG is arranged adjacent the front of the baby seat compartment BC between the spaced side walls 60 of the compartment. The compartment BC includes the baby seat bumpers BSB secured adjacent the lower front corners of the baby seat compartment for pivotally securing the baby seat gate BSG to the baby seat compartment BC; see FIG. 1, for example. The baby seat gate BSG and the baby seat bumpers BSB are constructed and defined relative to one another to maintain the baby seat gate in a releasable upright compartment closing position to function as a backrest for a baby seated in the compartment and to permit the gate to be released from its upright position to be swung either forwardly or rearwardly to overlie the bottom wall of the basket B or the baby seat compartment BC, respectively. For this purpose, each baby seat bumper BSB comprises two portions that are secured to opposite sides of each of the side walls 60 of the baby seat compartment BC. The baby seat gate BSG is formed with a U-shaped outer ring 70 interconnected with a horizontal wire rod 72 spaced below the U-shaped ring. The outer ring 70 at each end is constructed and defined with a substantially U configuration with one of the arms 70d of the U dependent from the bottom rod 72 of the gate BSG for pivotally supporting the gate on the baby seat bumper BSB. The other arm 72u of the U for the baby seat gate BSG is defined intermediate the top and bottom of the gate for releasably securing the gate in the upright compartment closing position. As specifically illustrated in FIG. 9, the dependent arm 70d for the gate BSG extends to the right a preselected horizontal distance which is larger than the distance provided for the upper arm 72u of the U. The upper arm 72u of the U configuration has a section which is parallel to the dependent arm 72d of the U configuration and is adapted to be releasably locked to the baby seat bumpers BSB which are defined for that purpose. The portions of the baby seat gate BSG between the outer ring 70 and the lower horizontal rod 72 may be constructed by means of rods running vertically in a spaced apart relationship as illustrated.

The baby seat bumpers BSB are constructed of two plastic parts, preferably of a polyethylene plastic. The part 76 is mounted on the inside wall of the baby seat compartment BC with the part 78 being mounted to the outside wall of the baby seat compartment opposite the part 76. Each of the parts 76 and 78 have a pair of spaced apertures 76a and 78a for receiving fasteners 80 for securing the two parts 76 and 78 on the side wall of the baby seat compartment BC, as is evident from FIG. 9. The inside part 76 has a U-shaped groove or locking notch 76u defined on the top surface thereof to lockingly receive the arm 72u of the U-shaped portion of the baby seat gate BSG, as illustrated in FIG. 9. The part 76 also has an elongated slot 76s adjacent the bottom thereof for slidably receiving the dependent arm 70d from the baby seat gate BSG to allow the gate to be moved upwardly and downwardly, and pivoted forwardly or backwardly. The arrangement of the baby seat gate BSG in an upright position relative to the baby seat bumper BSB is best illustrated in FIGS. 8 and 9. The baby seat gate BSG when in the upright position has a slight incline forwardly relative to the vertical, as illustrated in FIG. 8. Accordingly, when a baby is removed from the baby seat compartment BC and it is desired to increase the storage capacity of the basket by storing merchandise in the baby seat compartment, the baby seat gate BSG may be moved forwardly or rearwardly for this purpose. The forward and rear positions of the baby seat gate BSG are illustrated in FIG. 8 in dotted outline overlying the bottom wall of the basket B and the baby seat compartment BC, respectively. The ability to pivot the baby seat gate BSG rearwardly onto the bottom wall of the baby seat compartment BC permits the goods stored immediately forward of the baby seat compartment to rest on the bottom wall 20 of the basket B, so they need not be moved over the gate BSG, such as when the gate is in the rearward position.

The baby seat bumper part 76 is also provided with a forward ramp 76r for slidably receiving the baby seat gate BSG when the basket B is moved to its storage position. For this purpose, the ramp 76r is inclined at an approximately 45 degree angle and communicates with the groove or locking notch 76u. The opposite top wall portion 76f of the part 76 is at an elevated height relative to the top of the rams 76 to prevent the baby seat gate BSG from riding out of the locking notch 76u. When the basket B is moved rearwardly so that the front gate FG is in a horizontal position substantially as illustrated in FIG. 2, the baby seat gate BSG will ride up the ramp 76r and position itself in the notch 76u for the bumper part 76 and be secured therein. When the basket B is moved forwardly into the position illustrated in FIG. 1, the baby seat gate BSG will remain in its upright position, as illustrated in FIG. 9.

In moving the basket B to its storage position over the baby seat compartment BC, the pivotal action results in transmitting the shock forces to the baby seat compartment BC. In accordance with the present invention, any shock forces are transmitted to the handle portion 16h and not on the backseat compartment BC. For this purpose, the stiffening wire 60s for the side walls 60 of the baby seat compartment BC is extended beyond the rear of the compartment and immediately adjacent the handle portion 16h to transmit the shock forces to the handle portion. The stiffening wire 60s is bent at an approximately 90 degree angle to define an L-shaped portion 60sh engaging the handle portion 16h at the two arms of the L; see FIGS. 3 and 8a. The wire 60s extends across the back of the cart 10 in a spaced relationship with the handle H to the opposite side of the handle portion 16h and the opposite side wall 60 for the baby seat compartment BC, as can be seen from viewing FIG. 3. Any forces transmitted from the basket B when it assumes its vertical position will be transmitted by means of the wire rod 60s to the frame F by means of the handle portion 16h.

I claim:

1. A shopping cart comprising a wheeled chassis, an elevated frame carried by the chassis, an upwardly opening basket including spaced side walls upstanding from a bottom wall, the bottom wall being carried by said elevated frame, the basket having a gate at the front end thereof and open at the rear end thereof, a baby seat compartment secured to the rear portion of said elevated frame immediately behind the open rear end of said basket, said baby seat compartment including spaced side walls upstanding from a bottom wall, a baby seat gate arranged adjacent the front of the baby seat compartment between the spaced side walls of the baby seat compartment, and means for pivotally securing said baby seat gate to the baby seat compartment to permit said gate to be secured thereto in an upright position and secured against movement in either the forward or rearward direction, said means permitting release of the baby seat gate from its upright position to permit said gate to be swung down to rest on the bottom wall of said baby seat compartment or the bottom wall of said basket.

2. A shopping cart comprising a wheeled chassis as defined in claim 1 wherein the side walls of the basket includes hook means constructed and defined to extend forwardly of the basket for positively securing the front gate thereto, said front gate being pivotally mounted to the basket to be swung in an upright position to be secured to said hook means and releasable from the hook means to permit said gate to be swung to a basket open position.

3. A shopping cart comprising a wheeled chassis as defined in claim 1 wherein the hook means comprises a wire rod secured to the basket and provided with a curved end shaped with a reverse curve for defining a locking socket for positively securing the front gate thereto and said gate includes a U-shaped latch element extending rearwardly therefrom a preselected distance for releasably engaging the locking socket.

4. A shopping cart comprising a wheeled chassis, an elevated frame carried by the chassis, an upwardly opening basket including spaced side walls upstanding from a bottom wall, the bottom wall being carried by said elevated frame, the basket having a gate at the front end thereof and open at the rear end thereof, a baby seat compartment secured to the rear portion of said elevated frame immediately behind the open rear end of said basket, said baby seat compartment including spaced side walls upstanding from a bottom wall, the spaced side walls of the baby seat compartment being substantially longitudinally aligned with the adjacent side wall of said basket, a baby seat gate arranged adjacent the front of the baby seat compartment between the spaced side walls of the baby seat compartment, and means for pivotally securing said baby seat gate to the baby seat compartment to permit said gate to be secured thereto in an upright position and secured against movement in either the forward or rearward direction, said means permitting release of the baby seat gate from its upright position to permit said gate to be swung down to rest on the bottom wall of said baby seat compartment or the bottom wall of said basket.

5. A shopping cart comprising a wheeled chassis, an elevated frame carried by the chassis, an upwardly opening basket including spaced side walls upstanding from a bottom wall, the bottom wall being carried by said elevated frame, the basket having a gate at the front end thereof and open at the rear end thereof, a baby seat compartment secured to the rear portion of said elevated frame immediately behind the open rear end of said basket, said baby seat compartment including spaced side walls upstanding from a bottom wall, a baby seat gate arranged adjacent the front of the baby seat compartment between the spaced side walls of the baby seat compartment, and bumper means secured adjacent the lower front corners of the baby seat compartment for pivotally securing said baby seat gate to the baby seat compartment, said baby seat gate and said bumper means being constructed and defined relative to one another to maintain the gate in a releasable upright compartment closing position for seating a baby in the compartment and to permit the gate to be released from its upright position to allow it to be swung either forward or backward to rest on the bottom wall of the basket or the baby compartment.

6. A shopping cart as defined in claim 5 wherein the baby seat gate is shaped at each end to have a substantially U-configuration with one of the arms of the U dependent from the bottom of said gate for pivotally supporting the gate on said bumper means and the other arm of the U being defined intermediate the top and bottom of the gate for releasably securing the gate in said upright, compartment closing position.

7. A shopping cart as defined in claim 5 wherein the bumper means are each constructed and defined with a locking socket for releasably receiving and holding the baby seat gate to maintain the gate in said upright compartment closing position and an elongated slot for pivotally supporting the baby seat gate to permit it to be swung either forward or backward from the upright position.

8. A shopping cart as defined in claim 5 wherein said basket is pivotally secured to said elevated frame to permit said basket to be swung rearwardly to a basket storage position to permit the shopping cart to be nested with a similarly constructed shopping cart.

9. A shopping cart as defined in claim 8 wherein said basket is pivotally secured to said elevated frame to permit said basket to be swung rearwardly to a basket storage position to permit the shopping cart to be nested with a similarly constructed shopping cart, said bumper means including ramp means constructed and defined adjacent said locking socket to permit the gate to slide along the ramp means to be received and held in the locking socket when the gate rests on the bottom wall of the basket and the basket is swung to said basket storage position.

10. A shopping cart comprising a wheeled chassis, an elevated frame carried by the chassis, an upwardly opening basket including spaced side walls upstanding from a bottom wall, the bottom wall being carried by said elevated frame, the basket having an opening at the rear end thereof, a baby seat compartment secured to the rear portion of said elevated frame immediately behind the open rear end of said basket, said baby seat compartment including spaced side walls upstanding from a bottom wall, a baby seat gate arranged adjacent the front of the baby seat compartment between the spaced side walls of the baby seat compartment, means secured adjacent the lower front corners of the baby seat compartment for pivotally securing said baby seat gate to the baby seat compartment, said baby seat gate and said pivot means being constructed and defined relative to one another to maintain the gate in a releasable upright compartment closing position for seating a baby in the compartment and to permit the gate to be released from its upright position to be swung either forwardly or rearwardly to overlie the bottom wall of said basket or said baby compartment respectively, a front gate for the basket movably supported on the basket for opening and closing the front of the basket, and mounting means coacting between the front gate and the basket to pivotally support the gate for permitting movement of the gate between a position wherein the gate extends upwardly from the bottom wall of the basket for closing said opening and a position wherein the gate is maintained in an opened position and may be stored in a position located below and substantially parallel with the bottom wall of the basket.

11. A shopping cart as defined in claim 10 wherein the front gate and the front side walls of the basket are constructed and defined relative to one another to provide a positive latch for the front gate when in a basket closing position to prevent the unintentional opening of the latch included when the basket is laden with goods.

12. A shopping cart as defined in claim 10 wherein said mounting means comprises a pair of bumpers mounted adjacent the lower front corners of the basket, the bumpers each having an L-shaped guide track which includes an unwardly extending track portion for permitting the gate to be moved upwardly from the bottom wall of the basket for closing said front of the basket, said L-shaped guide track including an elongated substantially horizontally extending track portion which is connected to the lower end of said upwardly extending track portion and projects rearwardly of the basket through a substantial distance away from said front of the basket for permitting the gate to be positioned in an opened position located below and approximately parallel with said bottom wall.

13. A shopping cart as defined in claim 12 including means for interlocking said front gate and said mounting means for preventing the ready removal of the front gate from the market.

14. A shopping cart as defined in claim 13 wherein said interlocking means comprises guard means for each of said bumpers mounted in a preselected spaced relationship with the L-shaped guide track opposite to the upwardly extending track portion and the adjacent horizontally extending track portion for a preselected distance rearwardly of the front of the basket, said front gate and guard means being arranged in an interlocked relationship solely to prevent the gate from being removed from said guide track.

15. A shopping cart as defined in claim 13 wherein the elevated frame is constructed and defined of a single frame element having a substantially U-shaped portion at one end thereof arranged in a substantially horizontal plane for supporting said basket and a portion closing the end of the U-shaped portion and extending upwardly at a preselected obtuse angle relative to said horizontal plane to function as a handle for the shopping cart.

16. A shopping cart as defined in claim 11 wherein the side walls for the basket each include hook means constructed and defined to extend forwardly of the basket for positively securing a front gate thereto, and said front gate being constructed and defined with a latch extending rearwardly thereof and formed relative to said hook means to be positively latched thereto.

17. A shopping cart as defined in claim 14 wherein the side walls for the basket each include hook means constructed and defined to extend forwardly of the basket for positively securing a front gate thereto, and said front gate being constructed and defined with a latch extending rearwardly thereof and formed relative to said hook means to be positively latched thereto.

18. A shopping cart as defined in claim 17 wherein said hook means comprises a wire rod constructed integral with each side wall of said basket and formed with a portion extending forwardly of the front of the basket at a preselected angle from adjacent the bottom of the basket towards the top of the basket, said hook means being formed with a curved portion shaped into a reverse curved portion for positively and releasably securing said gate latch at said reversed curved portion.

19. A shopping cart as defined in claim 14 wherein the elongated frame is constructed and defined of a single frame element having a substantially U-shaped portion at one end thereof arranged in a substantially horizontal plane for supporting said basket and a portion closing the end of the U-shaped portion and extending upwardly at a preselected obtuse angle relative to said horizontal plane to function as a handle for the shopping cart.

20. A shopping cart as defined in claim 16 wherein said hook means and said front gate are constructed and defined relative to one another to cause the front gate to be spaced outwardly of the front of the basket when the front gate is positively latched to the hook means.

21. A shopping cart as defined in claim 18 wherein said hook means and said front gate are constructed and defined relative to one another to cause the front gate to be spaced outwardly of the front of the basket when the front gate is positively latched to the hook means.

22. A shopping cart as defined in claim 15 wherein said basket is pivotally secured to said frame to permit the basket to be swung rearwardly to a basket storage position over the baby seat compartment, the baby seat compartment and said handle are constructed and defined relative to one another for transmitting any forces imparted to the baby seat compartment to said handle.

* * * * *